United States Patent [19]
Kamejima et al.

[11] Patent Number: 5,436,843
[45] Date of Patent: Jul. 25, 1995

[54] SYSTEMS AND METHODS FOR RECYCLING RESOURCES AND CIRCULATING PRODUCTS

[75] Inventors: Kohji Kamejima, Ibaraki; Junichi Nishihashi, Urawa; Masakazu Ejiri, Tokorozawa; Masami Yamasaki, Saitama; Motohisa Funahashi, Sagamihara; Akira Masaki, Musashino; Tomoyuki Hamada, Abiko; Ichiro Nakamura, Katsuta; Kichie Matsuzaki, Yokohama, all of Japan

[73] Assignee: Hitachi, Ltd., Tokyo, Japan

[21] Appl. No.: 183,843

[22] Filed: Jan. 21, 1994

[30] Foreign Application Priority Data

Jan. 20, 1993 [JP] Japan .................................. 5-007156

[51] Int. Cl.⁶ .......................... G06F 15/00; B09B 3/00
[52] U.S. Cl. ................................ 364/468; 364/469; 209/3.3
[58] Field of Search ............... 364/468, 469, 478, 401, 364/420; 209/3.3, 518, 552, 576, 577, 583

[56] References Cited

FOREIGN PATENT DOCUMENTS 3-196888 8/1991 Japan .

*Primary Examiner*—Paul P. Gordon
*Attorney, Agent, or Firm*—Antonelli, Terry, Stout & Kraus

[57] ABSTRACT

A resource recycling system and a product circulation system, wherein a search is made for information regarding specifications and production methods for a recovered product and an original product is produced with the recovered product used as resources. These systems include a plurality of production factories for producing a predetermined products, and housing a production apparatus and a reclamation factory. A communication network is connected for transmitting therebetween production information necessary for producing products. Also a recycle plate is created for identifying a production apparatus. The plate is used to transmit accounting information on an amount of money required to reproduce the product from the reclaimed resources. The reclamation apparatus also identifies a production apparatus by which a recovered product was produced, extracts production information on the recovered product and generates a disassembly procedure for the recovered product from the extracted production information.

16 Claims, 17 Drawing Sheets

| PRODUCTION PROCEDURE | RECLAMATION PROCEDURE |
|---|---|
| TRANSPORT | TRANSPORT |
| GRAB | PLACE |
| MOUNT | DETACH |
| INSERT | PULL OUT |
| SCREW | LOOSEN |
| ·········· | ·········· |

SYSTEMS AND METHODS FOR RECYCLING RESOURCES AND CIRCULATING PRODUCTS

BACKGROUND OF THE INVENTION

The present invention relates to resource recycling and product circulation systems which allow products to be produced while useful resources are reused, and more particularly, to a system and method for automating disassembly operations for automatically extracting useful resources in a resource reclamation process, and a product circulation system and method for automating product specification decision operations in order to replace a previous product by a new product as well as establishing an accounting route for charging expenses required for the replacement of the previous product.

Problems in waste disposal and environmental pollution are presently so grave that environment protection is regarded as one of the most important social problems today. Associated with the environmental protection, resources are severely required to be reused.

On the other hand, a variety of techniques have been developed for the purpose of automatically producing products. For example, industrial robots for automated manufacturing, CAD (Computer Aided Designing) systems for automated designing have already been put to practical use. Also, techniques have been developed for integrating a variety of processes relating to the production on a computer system.

However, these conventional production systems are not developed in consideration of reverse processes, i.e., recycling processes for disassembling out-of-use products to reclaim reusable resources from the products. For this reason, an immense cost is required for reclaiming useful resources from such out-of-use products.

Further, the conventional production systems are not developed in consideration of replacement processes, i.e., reproduction processes for supplementing, as required, currently circulated products equivalent to those of a previous model. This also causes an immense cost to be required for replacing previous products.

SUMMARY OF THE INVENTION

The present invention has been made to solve the above-mentioned problems inherent to the conventional production processes, and a first object thereof is to provide a resource reclamation system and method for automatically extracting useful resources from used products or the like in a resource reclamation process as well as for accounting in order to rationally burden all related parties with a reclamation cost, thus promoting reuse of useful resources.

A second object of the present invention is to provide a product circulation system and method for automatically designing the specification of a corresponding new product in a replacement process, calculating compensation money in order to rationally burden all related parties with a production cost for a replacement product, and promoting a longer useful life of the product specification.

A third object of the present invention is to reduce a reclamation cost for products and to increase participants in a recycling process, thus reducing the total cost required for the resource recycling process.

To achieve the first object, the basic organization of the resource recycling system and method according to the present invention constitutes part of a system for extracting, from a product, information on the specification and production method of the product, and comprises production factories each having a production apparatus for producing the product; a reclamation factory having a reclamation apparatus for reclaiming resources used in the product; communication means for transmitting production information from the production apparatus to the reclamation apparatus; and a recycle plate for transmitting accounting information from the reclamation apparatus to the production apparatus, wherein the production information is transmitted from the production factory to the reclamation factory, and the reclamation factory extracts the production information on the product from the recycle plate mounted on a recovered product and generates a product disassembly procedure.

To achieve the second object, the basic organization of the product circulation system and method constitutes part of a system for extracting information from a product on the specification and producing method of the product for reproduction, and comprises production factories each having a production apparatus for producing the product; a recovery factory having a recovery apparatus for recovering products; communication means for transmitting product information from the production apparatus to the recovery apparatus; and a product circulation plate for transmitting compensation money information from the recovery apparatus to the production apparatus, wherein information on the specification and production method of the product is extracted from the product circulation plate mounted on each of the recovered products and transmitted to the production factory.

Additionally, the resource recycle as considered in the present invention will be explained below.

The present invention is intended to automate disassembly processes for reclaiming resources as well as to establish an accounting route for expenses required for the reclamation errors. For this purpose, the present invention provides an information circulation line between the reclamation factory for disassembling products to reclaim resources and the production factories for producing products. The information circulation line includes a computer network and two paths for circulating plates.

The reclamation factory accesses one of the production factories through the computer network to extract therefrom production information on a product. Then, the reclamation factory automatically creates information on product disassembly based on the extracted production information.

In the production factory, on the other hand, recycle plates issued by the reclamation factory are purchased therefrom and are mounted to products before shipment. The plates are utilized to write information for accessing production information thereon.

The plate serves as guaranty to ensure that a product with this plate is recovered by the reclamation factory. For example, consumers can trust the reclamation factory with reclamation processing on unnecessary products having the recycle plates mounted thereon.

The basic functions of the resource recycling system and the product circulation system according to the present invention will be explained with reference to FIGS. 1 and 2.

FIG. 1 is a diagram for explaining the principle of a resource recycling system; and FIG. 2 is a diagram for explaining the principle of a product circulation system.

The systems in FIGS. 1 and 2 include a production factory 1; a reclamation factory 2; a recovery factory 3; a recycle plate 5; and a product circulation plate 6. It may be understood that products are circulated among the factories and consumers through the recycle plate 5 or the product circulation plate 6 in the direction indicated by the arrows in each of the cycles in FIGS. 1, 2.

More specifically, in the resource recycling system shown in FIG. 1, the production factory 1 ships products after the recycle plate 5, on which production information has been written, is mounted to each of them. The reclamation factory 2 extracts the production information based on the recycle plate 5 mounted on each of the recovered products to automatically create a disassembly procedure for that product.

In the product circulation system shown in FIG. 2, the production factory 1 ships products after the product circulation plate 6, on which product information has been written, is mounted to each of them. The recovery factory 3 extracts the product information based on the product circulation plate 6 mounted on each of recovered products to automatically create a product manufacturing procedure for a currently circulated product corresponding to the recovered product.

DESCRIPTION OF THE PREFERRED EMBODIMENTS

The present invention will hereinafter be described in connection with the preferred embodiments thereof with reference to the accompanying drawings.

Figure 3:
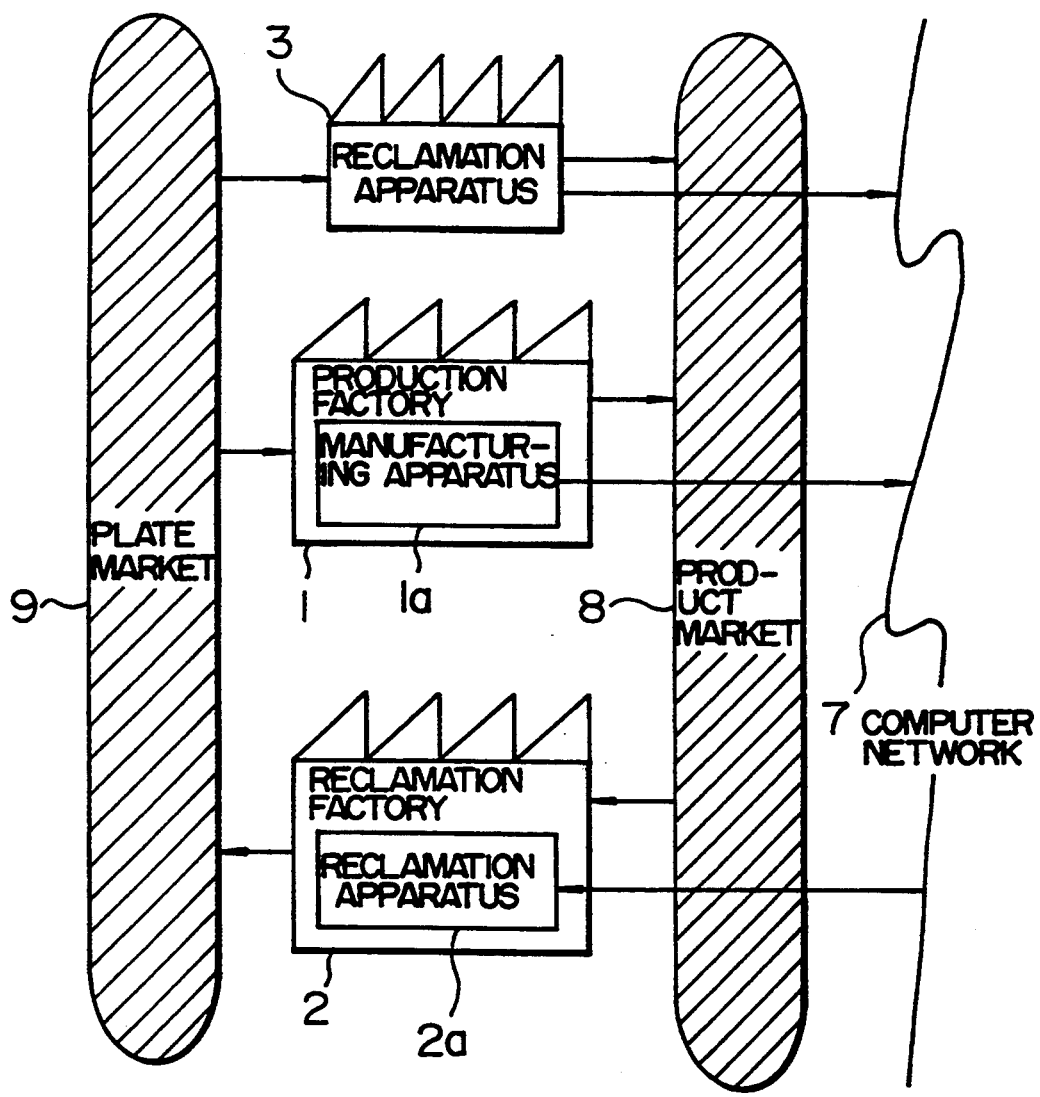
FIG. 3 is a schematic diagram showing a resource recycling method.
Figure 4:
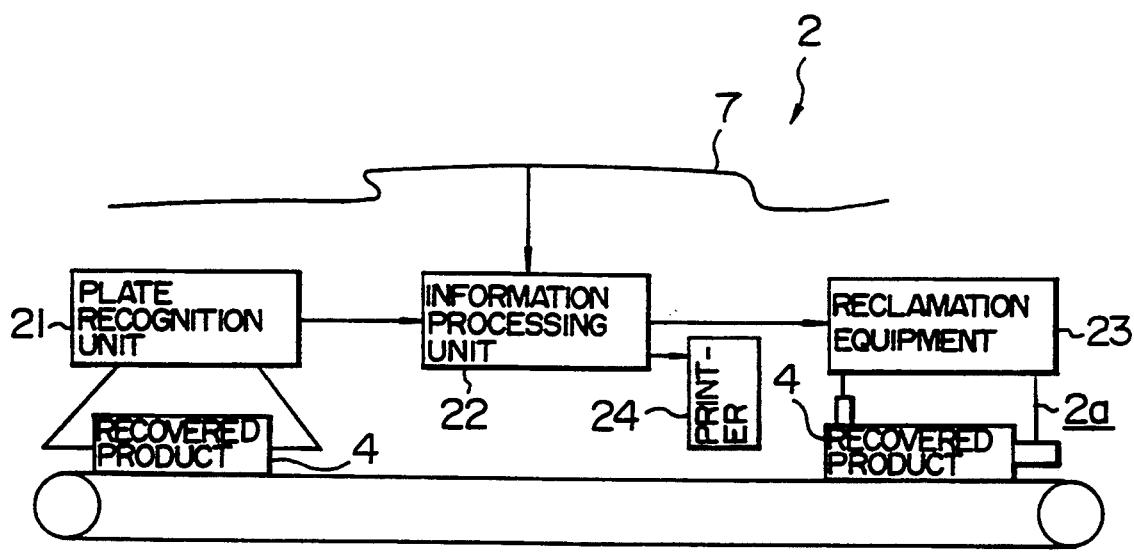
FIG. 4 is a block diagram showing the configuration of a reclamation factory.

FIG. 3 is a schematic diagram showing a resource recycling system and method according to one embodiment of the present invention, and FIG. 4 is a block diagram showing the configuration of a reclamation factory.

The resource recycling system of FIG. 3 includes a production factory 1; a manufacturing apparatus 1a; a reclamation factories 2, 3; a reclamation apparatus 2a; a computer network 7 associated with a communication means for transmitting information; 9 a product market; and 9 a plate market.

The essence of the resource recycling lies in the automation of disassembly operations for reclaiming resources and the establishment of an accounting route for expenses required for the resource reclamation process. For this purpose, the resource recycling system and method shown in FIG. 3 provide an information circulation route between the reclamation factory 2 for disassembling products to reclaim resources from the disassembled products and the production factory 1 for producing products. Specifically, this information circulation route comprises a computer network 7 and two paths for plate circulation.

The computer network 7 couples a production apparatus, referred later to, with the reclamation apparatus 2a, and is utilized, for example, for transmitting production information from the production factory 1 to the reclamation factory 2. Specifically, the reclamation factory 2 accesses the production factory 1 through the computer network 7 to extract production information on a product to be disassembled. The reclamation factory 2 automatically creates information on product disassembly for products from which resources are to be reclaimed (recovered products) based on the production information thus acquired. The detail of this process will be described later.

Figure 1:
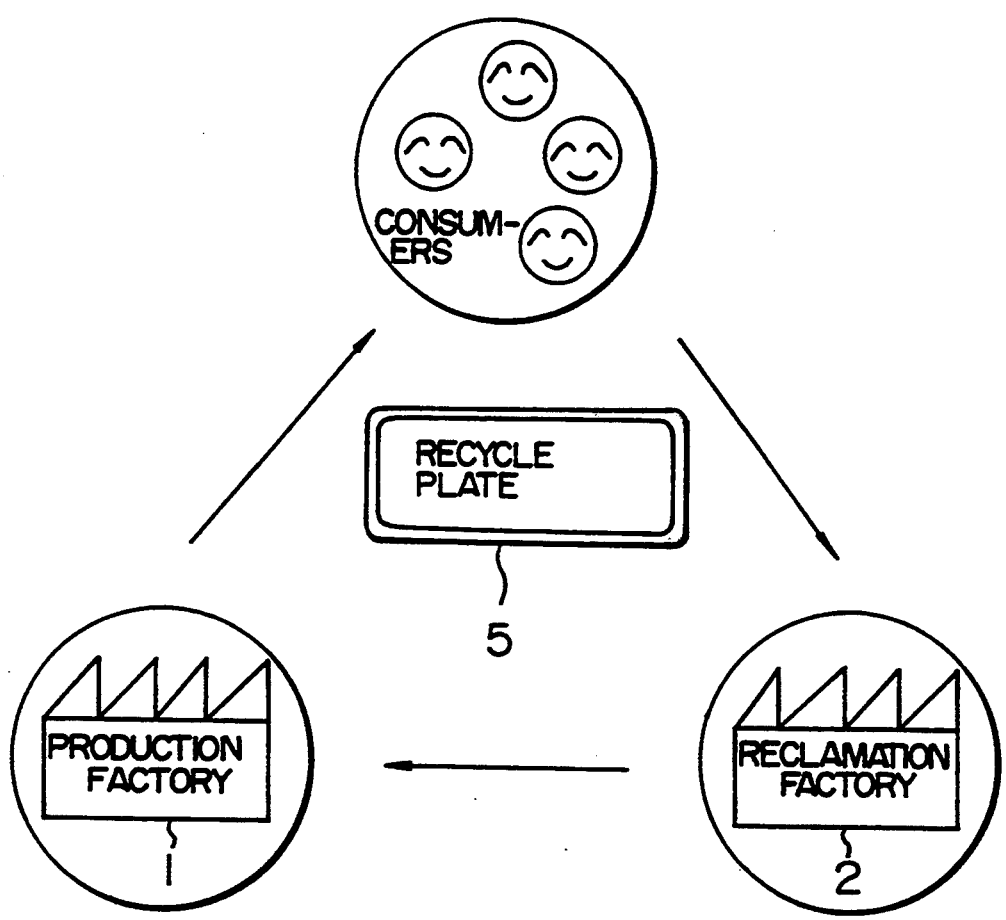
FIG. 1 is a diagram for explaining the principle of a resource recycle system according to one embodiment of the present invention.

The plate circulation route comprises a plate market 9 and a product market 8. The product market 8 may be assumed where consumers exist as shown in FIG. 1.

The reclamation factory 2 issues recycle plates 5 (see FIG. 1) to the plate market 9 as well as recovers products with the recycle plate 5 from the product market 8.

The production factory 1, in turn, obtains the recycle plates 5 from the plate market 9 and ships products having the recycle plates 5 mounted thereon to the product market 8. In this event, the production factory 1 writes information for accessing production information on the recycle plate 5. This recycle plate 5 serves as the guaranty to ensure that a product with the recycle plate 5 is recovered by the reclamation factory 2. For example, consumers can trust the reclamation factory 2 with reclamation processing of unnecessary products with the recycle plate 5 mounted thereon.

Next, the configuration of the reclamation factory 2 will be explained in detail with reference to FIG. 4.

The reclamation apparatus 2a provided in the reclamation factory 2 is constructed of a plate recognition unit 21; an information processing unit 22; and reclamation equipment 23.

The plate recognition unit 21 recognizes the recycle plate 5 (an example of which will be later described) mounted on a recovered product 4 sent from the product market 8, and transmits the recognition result to the information processing unit 22. The information processing unit 22 creates a control program for the reclamation equipment 23 based on the plate recognition result, and generates accounting information in accordance with this control program.

The reclamation equipment 23 disassembles the recovered product 4 in accordance with the control program created by the information processing unit 22 to reclaim useful resources from the recovered product 4.

The reclamation factory 2 is also provided with a printer 24 such that product category information and information regarding an amount of accounting money can be written on a recycle plate 5A under the control of the information processing unit 22, as will be described later in greater detail.

Figure 5:
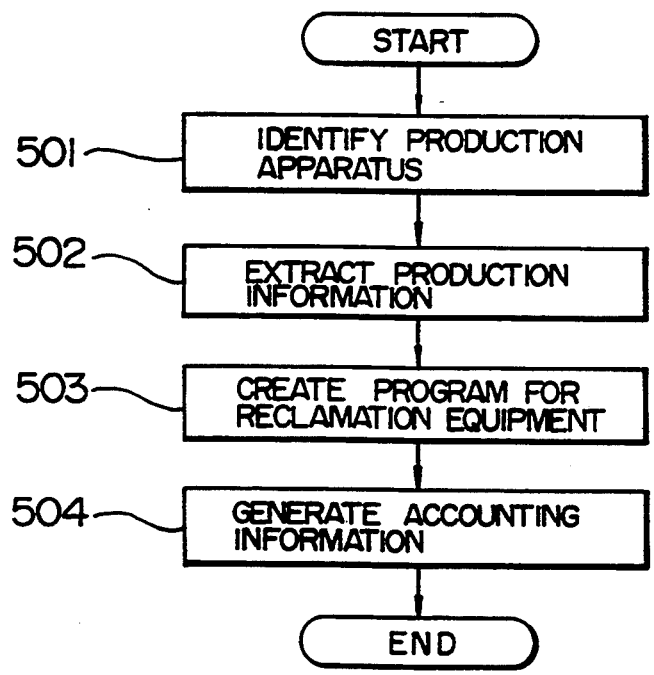
FIG. 5 is a flow chart showing a flow of processing executed by an information processing unit in the reclamation factory.

The operation of the information processing unit 22 in the reclamation factory shown in FIG. 4 is illustrated in FIG. 5.

FIG. 5 is a flow chart showing a flow of processing executed by the information processing unit 22 in the reclamation factory.

The information processing unit 22 first identifies, based on the plate recognition result delivered from the plate recognition unit 21, a production apparatus by which the recovered product 4 associated with the recognized recycle plate 5 was produced in the production factory (step 501). The information processing unit 22 next accesses the identified production apparatus in the production factory through the computer network 7 to extract production information corresponding to the recovered product 4 which has been stored in the production apparatus (step 502). The information processing unit 22, with the production information thus obtained, creates a control program for the reclamation equipment 23 (step 503). Simultaneously, the information processing unit 22 adds up costs required for the reclamation processing as well as generates and outputs accounting information (step 504).

Next, explanation will be given of the principle of programming the reclamation apparatus.

Figures 6, 7:
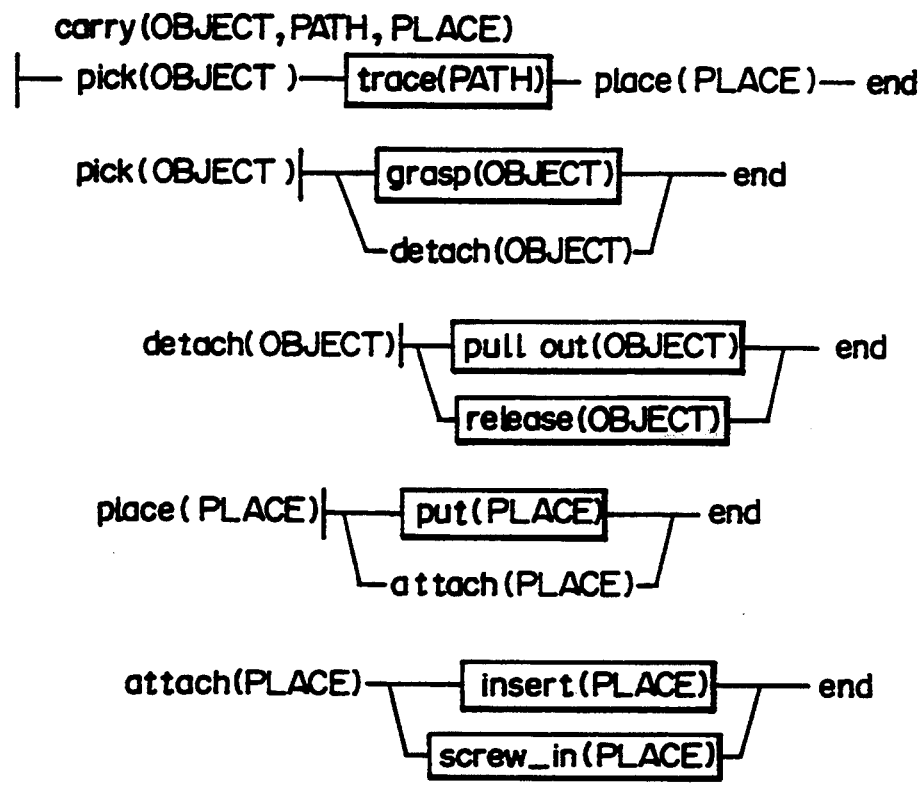
FIG. 6 is an explanatory diagram showing an example of symbolic representation of a work procedure in reclamation equipment.
FIG. 7 is a table for explaining conversions between a production procedure and a reclamation procedure.

FIG. 6 is an explanatory diagram showing an example of a symbolically represented work procedure in the reclamation equipment; FIG. 7 is a table for explaining conversions between a production procedure and a reclamation procedure; and FIG. 8 is a diagram for explaining a control method for the reclamation equipment.

Nowadays, a variety of techniques for abstractly expressing complicated operations have been developed through investigations of intelligent robots and so on. FIG. 6 shows an example of such representation. This example symbolically represents an operation for transporting an object (OBJECT) to a predetermined place (PLACE) through a path (PATH). By the use of such symbolic representation, a production procedure can be converted into a disassembly procedure.

For generating a disassembly procedure, the procedure of FIG. 6 may be traced in the reverse order, as assembling operations (constituting the assembly procedure) are replaced by corresponding disassembling operations (constituting a reclamation procedure). An example of a correspondence table between assembly and disassembly, i.e., a conversion table between the production procedure and the reclamation procedure is shown in FIG. 7. It can be seen from this table that a corresponding disassembly operation reverse to "mount" in the assembly procedure is "detach", and a corresponding disassembly operation reverse to "insert" in the assembly procedure is "pull out", by way of example.

Figure 8:
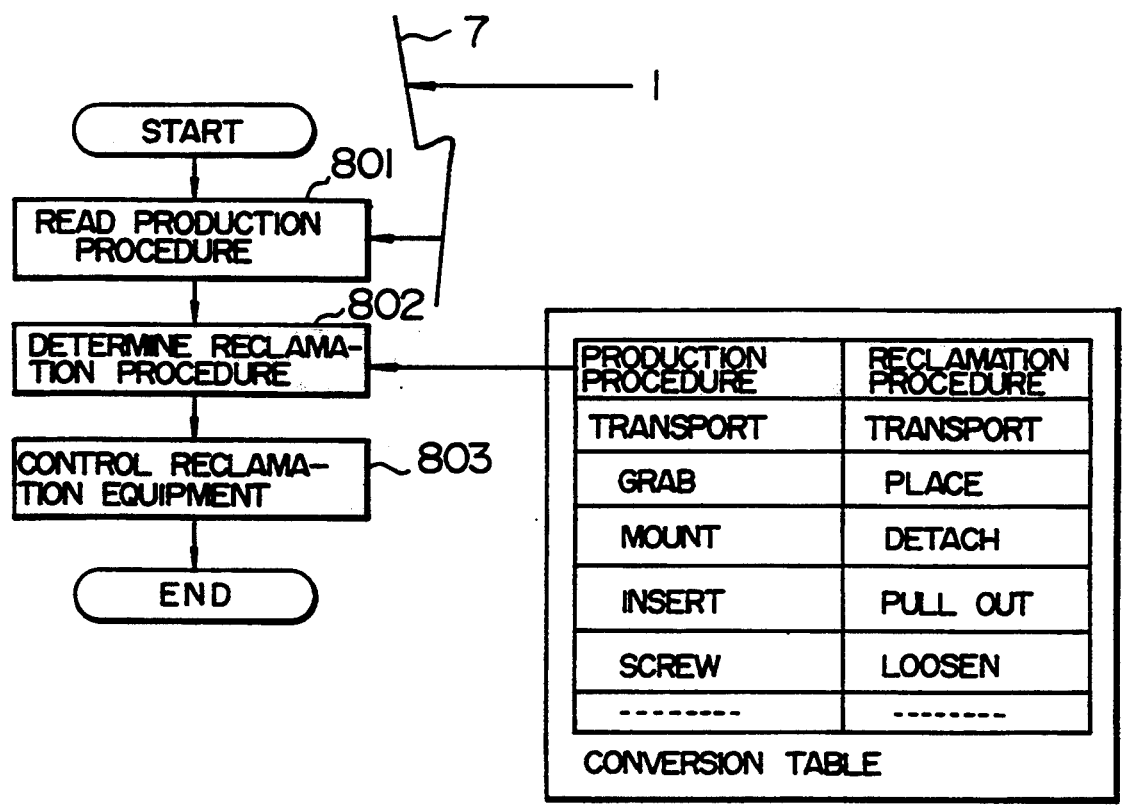
FIG. 8 is a diagram for explaining a control method for the reclamation equipment.

FIG. 8 shows a control method for the reclamation equipment 23 in the reclamation factory 2 of this embodiment. In FIG. 8, a portion showing a production factory corresponds to FIG. 9, later described, and a portion shown as a conversion table corresponds to FIG. 7.

In the reclamation factory shown in FIG. 4, the reclamation equipment 23 is controlled on the basis of production information extracted from the production apparatus 11 through the computer network 7. More specifically, as shown in a flow chart in FIG. 8, a production procedure is read from the production apparatus 11 (step 801); a reclamation procedure is determined from the conversion table (step 802); and the reclamation equipment 23 is controlled in accordance with the determined reclamation procedure (step 803).

Figure 9:
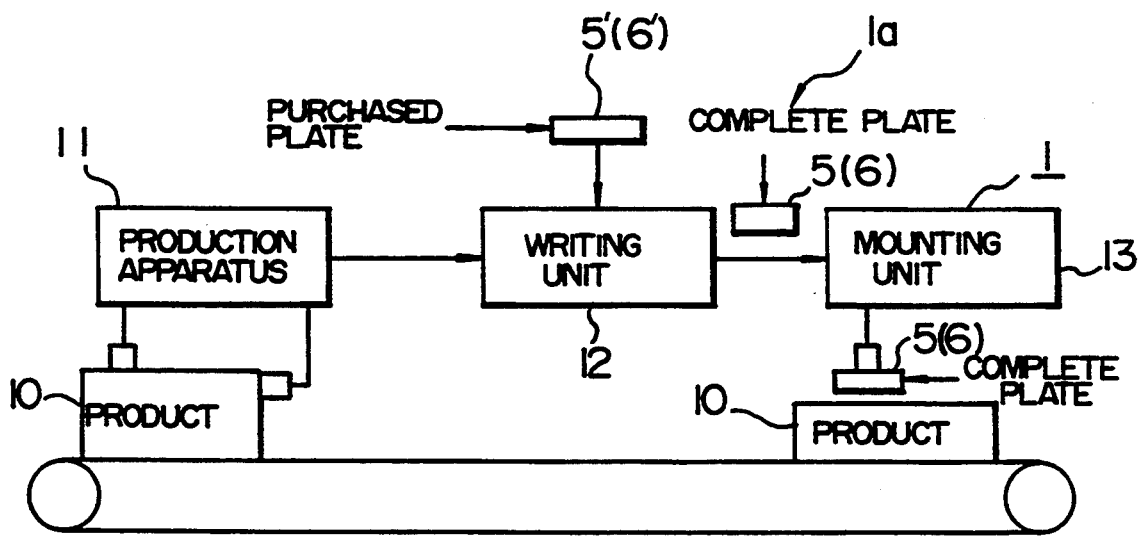
FIG. 9 is a block diagram showing the configuration of production factory.

FIG. 9 is a block diagram showing the configuration of the production factory.

The production factory 1 of this embodiment is provided with a writing unit 12 and a mounting unit 13, in addition to an ordinary production apparatus 11, to constitute the manufacturing apparatus 1a (FIG. 3).

The writing unit 12 receives from the reclamation factory 2 a recycle plate 5' purchased through the plate market 9, writes production information thereon, and outputs the recycle plate 5 as a complete plate which is then mounted to a product 10 in the mounting unit 13.

The plate processing will hereinafter be explained in greater detail with reference to FIGS. 10-18.

Figure 10:
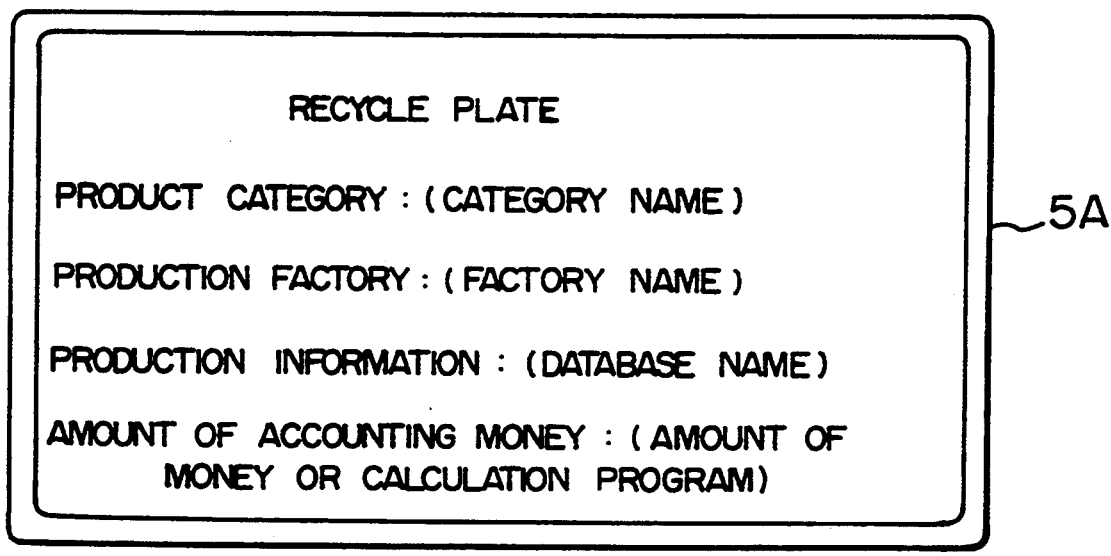
FIG. 10 shows a front view of a complete recycle plate.
Figure 11:
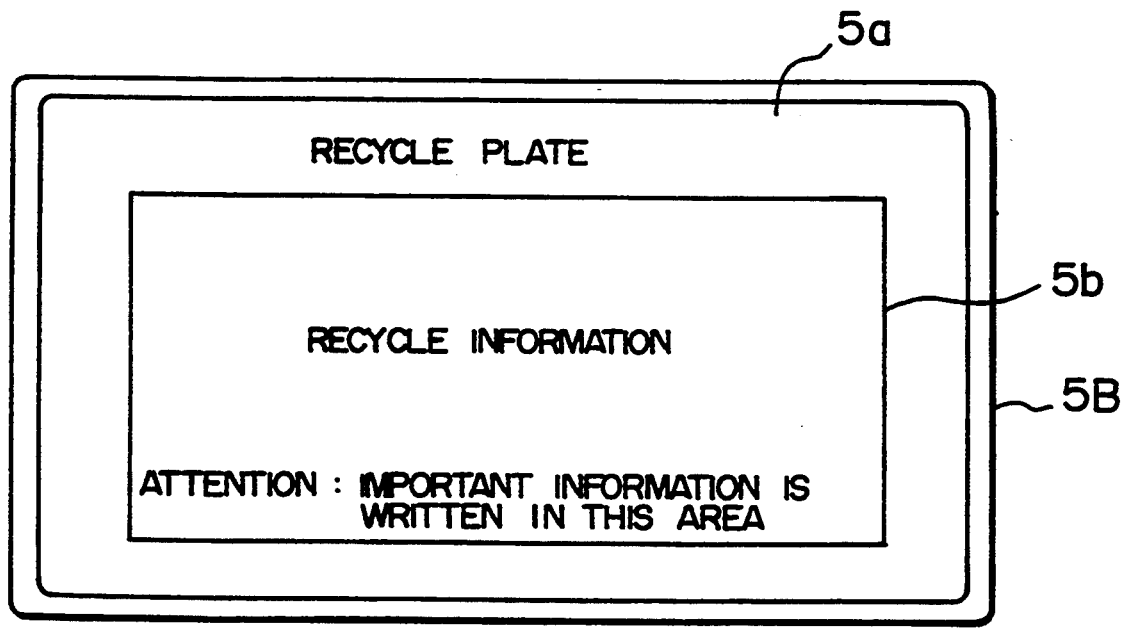
FIG. 11 shows a front view of another complete recycle plate.
Figure 12:
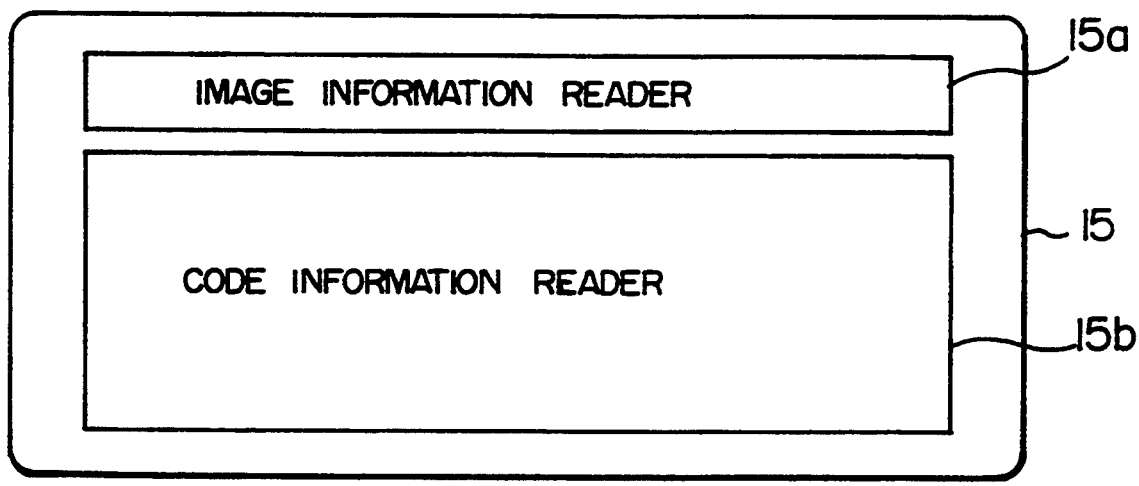
FIG. 12 shows a front view of a plate reading unit.
Figure 13:
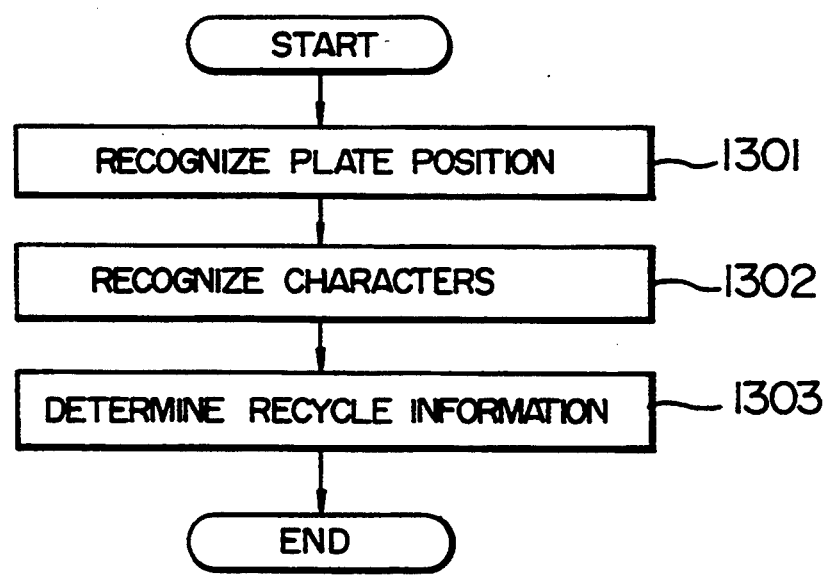
FIG. 13 is a flow chart showing a processing flow of the plate reading unit.
Figure 14:
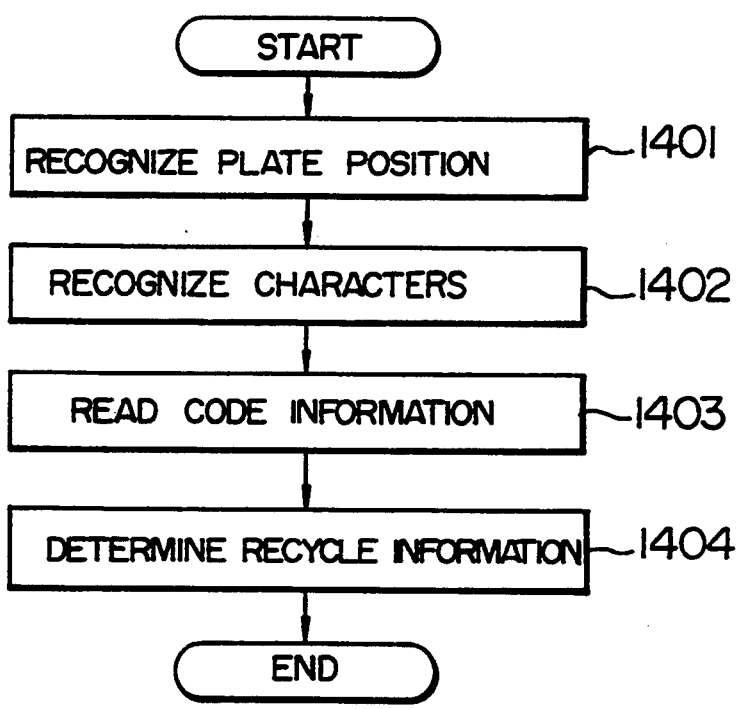
FIG. 14 is a flow chart showing a processing flow of another plate reading unit.
Figure 15:
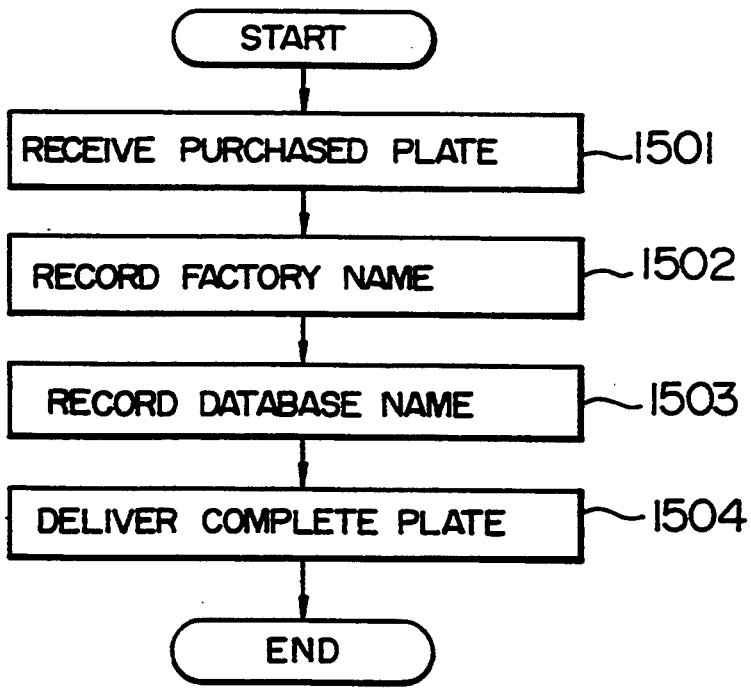
FIG. 15 is a flow chart showing a flow of operations executed by a writing unit in a production factory.
Figure 16:
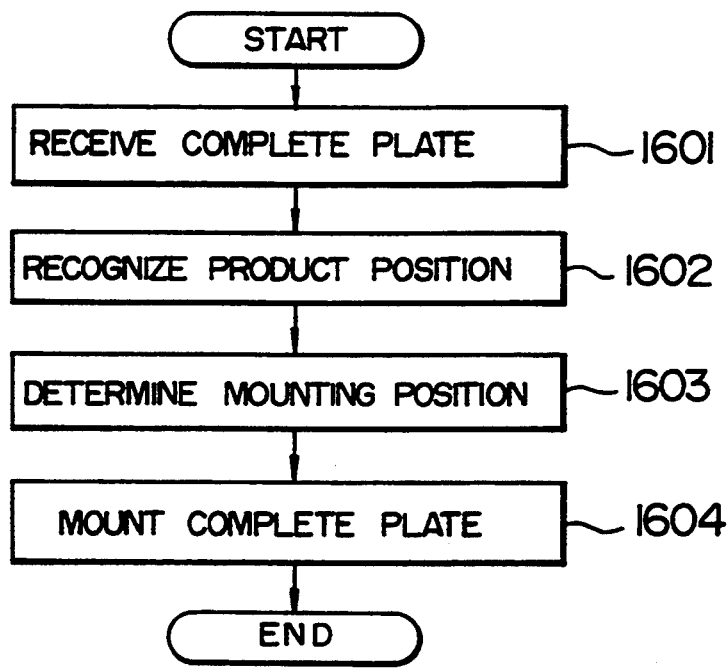
FIG. 16 is a flow chart showing a flow of operations executed by a mounting unit in the production factory.
Figure 17:
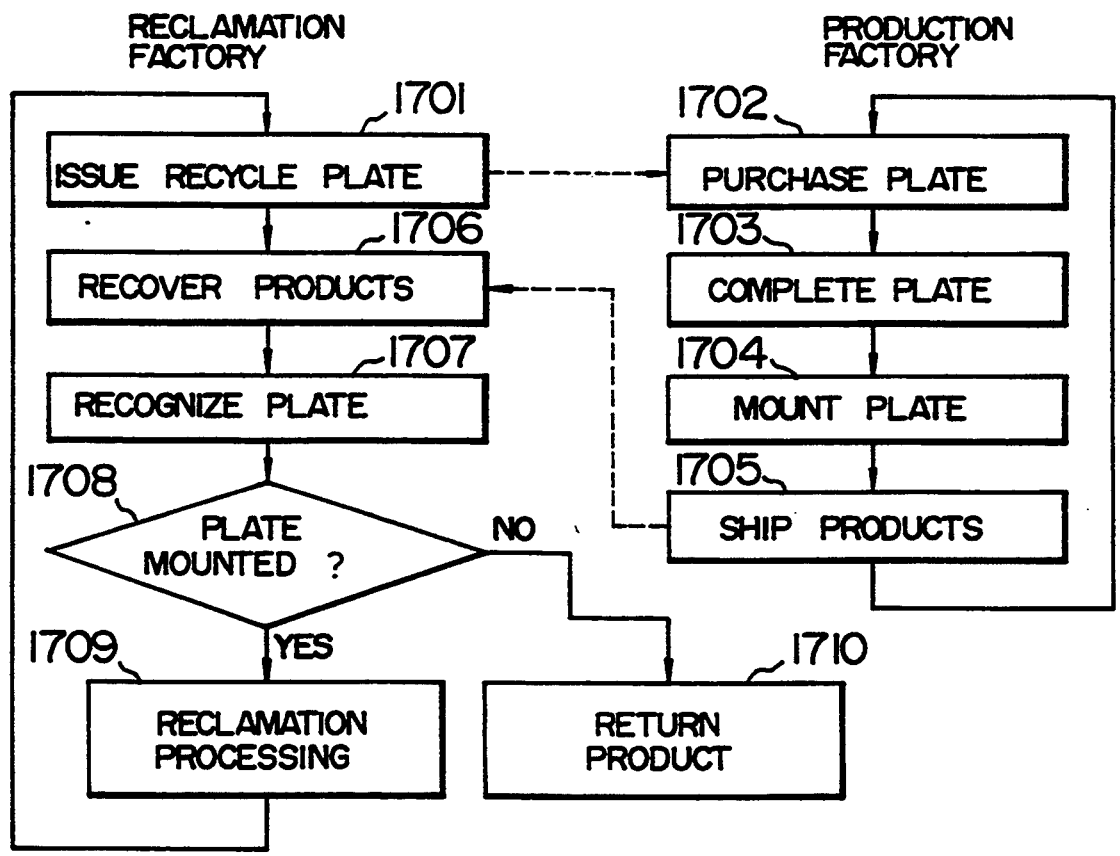
FIG. 17 is a flow chart showing a flow of a plate for accounting.
Figure 18:
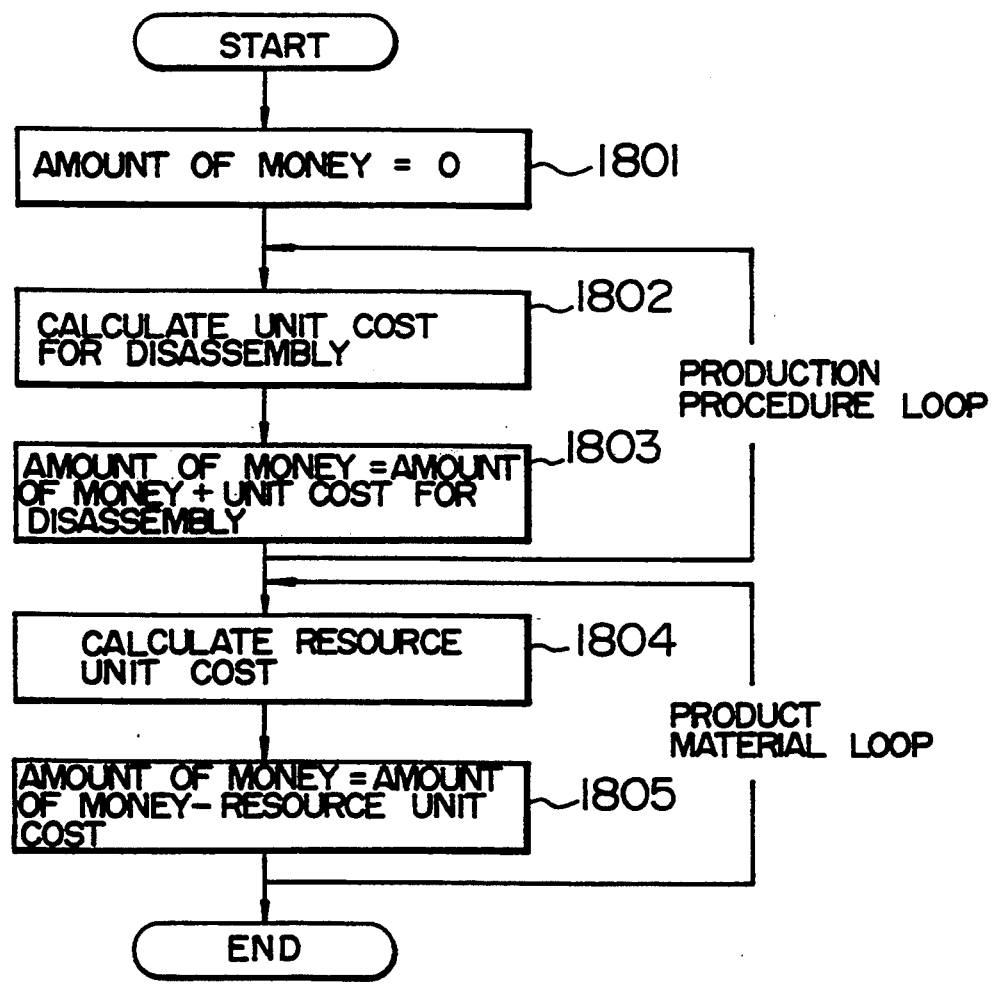
FIG. 18 is a flow chart showing a procedure of accounting calculations.

FIG. 10 shows a front view of a complete recycle plate; FIG. 11 shows a front view of another complete recycle plate; FIG. 12 shows a front view of a plate reading unit; FIG. 13 is a flow chart showing operations performed by the plate reading unit; FIG. 14 is a flow chart showing operations performed by another plate reading unit; FIG. 15 is a flow chart showing operations performed by the writing unit in the production factory; FIG. 16 is a flow chart showing operations performed by the mounting unit in the production factory; FIG. 17 is a flow chart showing a flow of a plate for accounting; and FIG. 18 is a flow chart showing a procedure of accounting calculations.

Recorded on a recycle plate 5A shown in FIG. 10 are recycle information, i.e., a category name indicating a product category; a factory name indicative of a production factory where the product was produced; a database name indicating a location where production information is stored; and an amount of money indicating an amount of accounting money or an accounting money calculation program.

Within the recorded information, the production factory information and the production information are recorded by the writing unit 12 in the production factory 1. On the other hand, the product category information and the accounting money amount information may be recorded either by the writing unit 12 in the production factory 1 or by the printer 24 in the reclamation factory 2.

Another recycle plate 5B shown in FIG. 11 has the recycle information recorded in a machine readable form. Within the recorded items, the production factory information and the production information are recorded by the writing unit 12 in the production factory 1, while the product category information and the accounting money amount information may be recorded either in the production factory 1 or in the reclamation factory 2 as is the case of the recycle plate 5A of FIG. 10.

The machine readable information recording form may be implemented by using a bar code, magnetic sheet or the like. Such information recording and reading techniques have been widely utilized in cash registers, bank cash dispenser terminals, and so on. However, for reading the recycle information from the plate of this embodiment, it is necessary to recognize the position of the recycle plate 5 mounted on a product and read characters and code information within the plate. An example of an automatic reading unit for such recycle information is shown in FIG. 12.

FIG. 12 only illustrates a portion of a plate reading unit 15 which is opposite to the plate. The plate reading unit 15 comprises an image information reader 15a and a code information reader 15b. Preferably, the image information reader 15a and the code information reader 15b are disposed corresponding to the positions of a recording area for plate characters (recycle plate 5a) and a recording area for code information (recycle information 5b) of FIG. 11, respectively.

FIG. 13 represents in a flow diagram form the processing of the writing unit for the recycle plate 5A shown in FIG. 10. In other words, illustrated therein is a procedure of reading the recycle plate 5A, which includes recognition of the plate position (step 1301); recognition of the plate characters (step 1302); and determination of the recycle information (step 1303).

For reading the recycle plate 5A shown in FIG. 10, the plate reading unit may be provided only with an image information reader. Such a reading unit may be readily constructed by using figure (i.e., the shape of the plate,) and character (i.e., the recycle information) recognition techniques which have been widely applied to production facilities.

FIG. 14 shows a processing flow of the reading unit for the recycle plate 5B shown in FIG. 11. In other words, a procedure of reading the recycle plate 5B is illustrated. Specifically, the plate position is recognized. (step 1401); characters are recognized (step 1402); code information is read (step 1403); and the recycle information is determined (step 1404).

Reading the recycle plate 5B shown in FIG. 11 may require the plate reading unit 15 as shown in FIG. 12 which comprises the image information reader 15a and the code information reader 15b. In the flow shown in FIG. 14, the image information reader 15a is used at the plate position recognition and character recognition steps (1401, 1402), and the code information reader 15b is used at the code information reading step (1403).

FIG. 15 shows a processing flow of the writing unit 12 in the production factory of this embodiment.

It is assumed in FIG. 15 that the product category information and the accounting money amount information have already been written on a purchased recycle plate. Therefore, FIG. 15 shows a processing flow for writing production factory information and product information on the recycle plate.

Specifically, the writing unit 12 of FIG. 9 receives a purchased recycle plate 5' (step 1501); records the production factory name thereon (step 1502); records the name of a database in which production information is stored (step 1503); and delivers a complete recycle plate 5 to a mounting unit 13 (step 1504).

FIG. 16 shows a processing flow of the mounting unit 13 in the production factory of this embodiment.

The mounting unit 13 of FIG. 9 has functions of receiving the recycle plate 5, which is a complete plate, from the writing unit 12 (step 1601) and mounting the recycle plate 5 to a product 10. For these functions, the mounting unit 13 first recognizes the position of the product 10 to which the recycle plate 5 is to be mounted (step 1602), and then determines the position on the product 10 at which the recycle plate 5 is mounted, based on the position recognition result (step 1603). Finally, the complete plate is mounted to the mounting position on the product 10 (step 1604).

FIG. 17 shows a flow of a plate for accounting according to a recycling method of this embodiment.

A recycle plate 5 is issued from the reclamation factory 2 shown in FIG. 3 (step 1701), and returned to the reclamation factory 2 after a product with the recycle plate 5 mounted thereon is recovered. In the meantime, the production factory 1 purchases a recycle plate (step 1702), and writes required information thereon to complete the recycle plate 5 (step 1703); mounts this recycle plate 5 to a product 10 (step 1704); and ships the product (step 1705), by the methods shown in FIGS. 14, 15 and 16.

The recycle plates 5 mounted on the products shipped from the production factory 1 are brought to consumers through the product market 8 and remain therewith. Unnecessary products are taken back to the reclamation factory 2 as recovered products together with the recycle plates 5 (step 1706).

In the reclamation factory 2, the recycle plate 5 of each recovered product 4 is recognized (step 1707). The recovered product 4, the plate of which is recognized therein, is subjected to the aforementioned reclamation processing (step 1709) to reclaim resources. In this event, the recovered plates themselves may also be reused as new plates for other products, after erasing information recorded thereon corresponding to individual recovered products. On the other hand, the recovered products 4, the recycle plate 5 of which is not recognized, are returned (step 1710) in this embodiment. It should however be understood that this is a mere example, and another processing method may be taken for the recovered products, the recycle plate 5 of which was not recognized.

FIG. 18 shows an example of an accounting calculation procedure according to the resource recycling method of this embodiment.

In the flow of accounting calculations shown in FIG. 18, a recycle cost is calculated by subtracting the value of reclaimed resources from a cost required for the disassembly of products. In other words, a list of materials used in the product and a production procedure are obtained from the production information extracted from the production factory 1. Tracing the production procedure for each of parts used in the product, a unit cost for disassembling the part is calculated when the disassembly procedure is defined by the aforementioned method, and the unit costs for disassembling all parts are added along the production procedure (steps 1801–1803).

After all parts are disassembled, unit costs for the respective resources used in the parts are added as the list of materials used in the product is traced. In this event, the resource unit costs are added such that the reclamation cost is reduced (steps 1804, 1805).

While it may appear from the explanation thus far regarding the embodiment in that a single production factory and a single reclamation factory exist, a plurality of production factories and reclamation factories are actually connected to a computer network and distributed between the plate market and the production market. Such an organization similarly applies to a reclamation factory which will be described in detail in connection with a circulation system shown in FIG. 19 and subsequent thereto.

With the resource recycling system and method of this embodiment, the connection between the production factory 1 and the reclamation factory 2 may be optionally changed as long as they can access the computer network 7 and the plate market 9. As a result, the competition principle also acts on the reclamation factory 2. More specifically, even with the same product, the reclamation costs for the product (costs recorded on the recycle plates) may vary due to difference in the disassembly unit costs calculated by respective reclamation factories based on the cost calculation shown in FIG. 18. This competition will result in further promoting reuse of useful resources.

Next, explanation will be made of an embodiment in which the present invention is applied to a product circulation system and method with reference to FIGS. 19–27.

Figure 19:
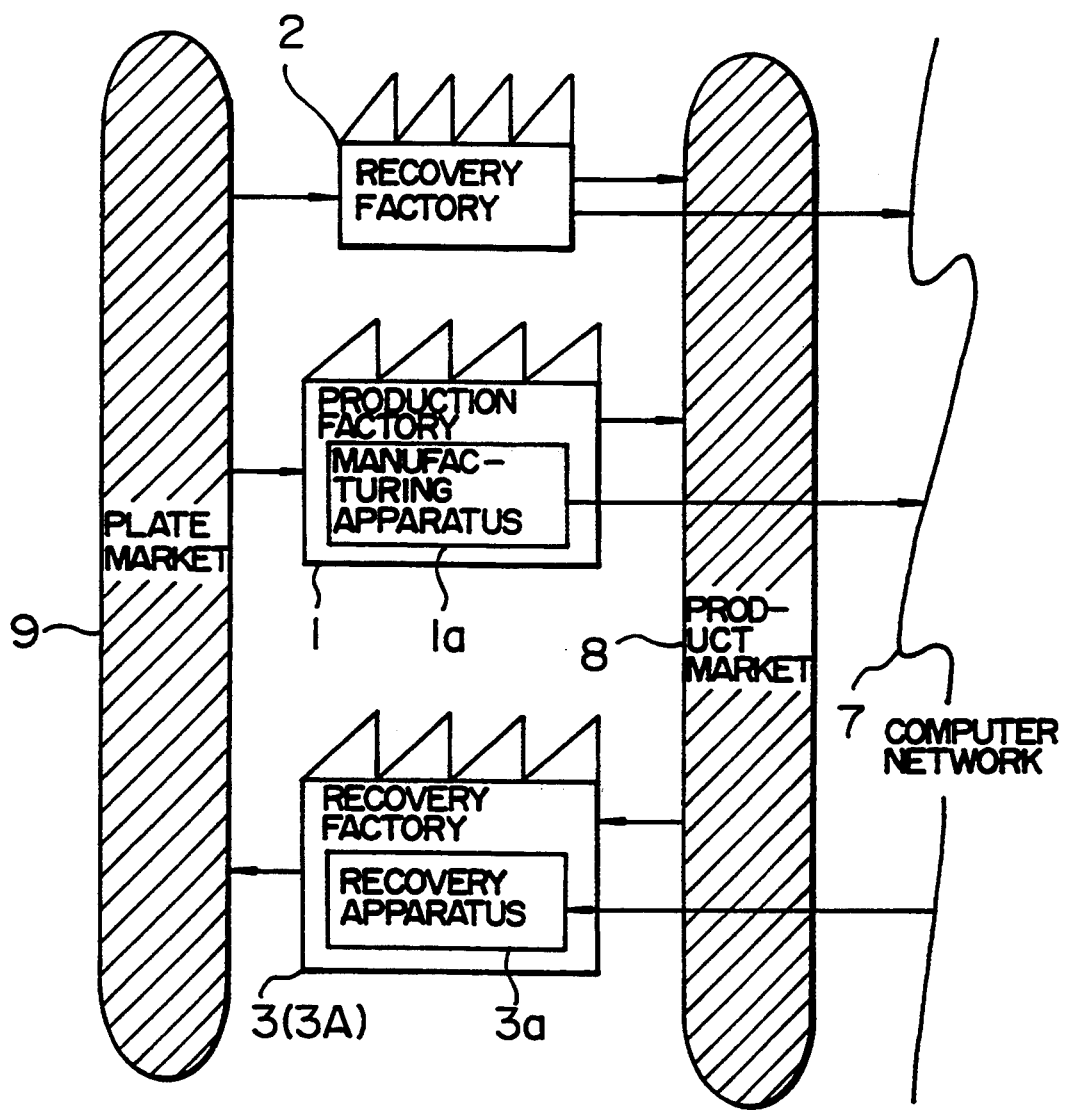
FIG. 19 is a schematic diagram showing a part circulation method according to another embodiment of the present invention.
Figure 20:
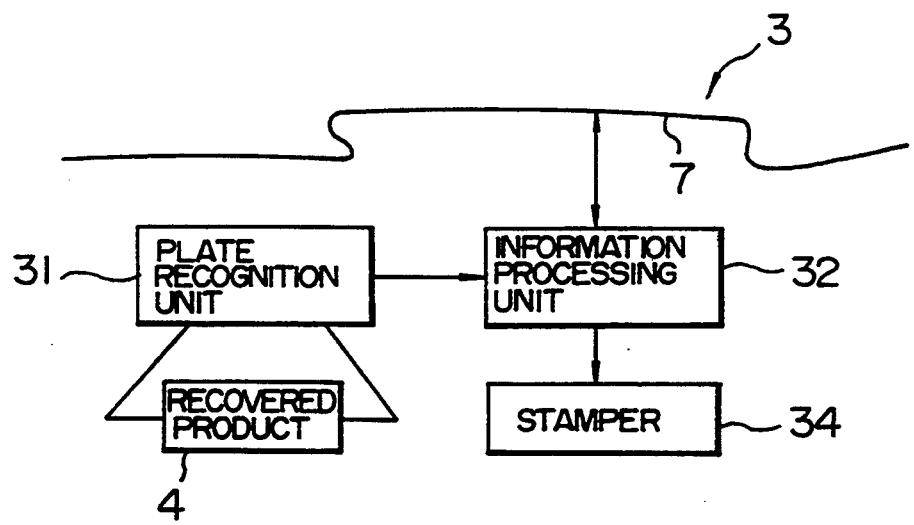
FIG. 20 is a block diagram showing the configuration of a recovery factory.
Figure 21:
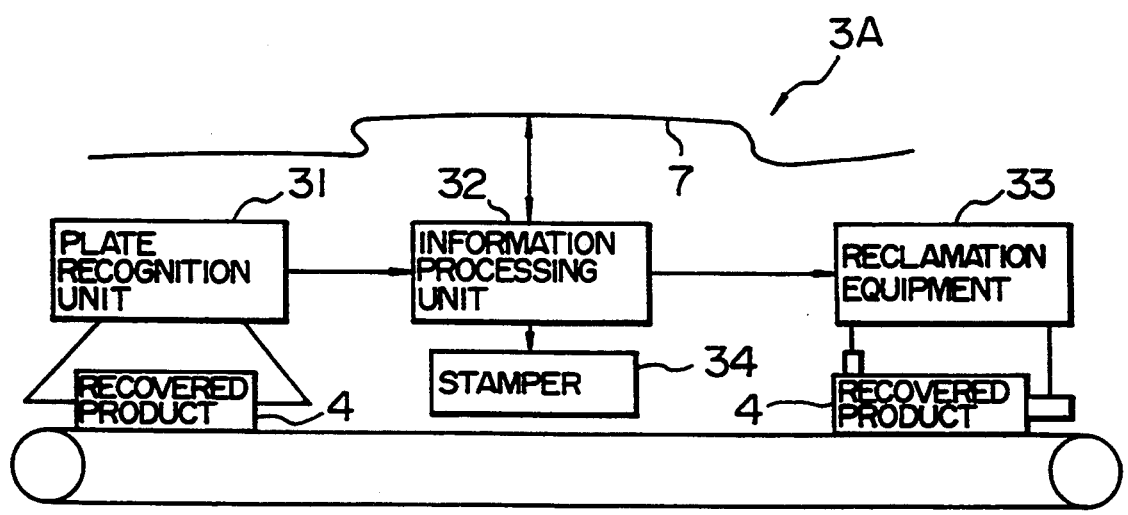
FIG. 21 is a block diagram showing the configuration of another recovery factory.
Figure 22:
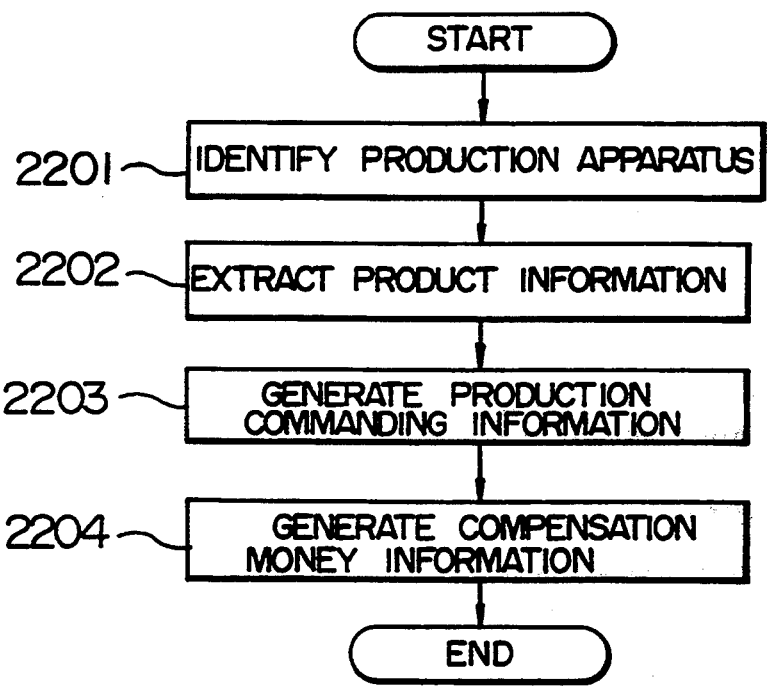
FIG. 22 is a flow chart showing a flow of processing executed by an information processing unit in the recovery factory of FIG. 20.
Figure 23:
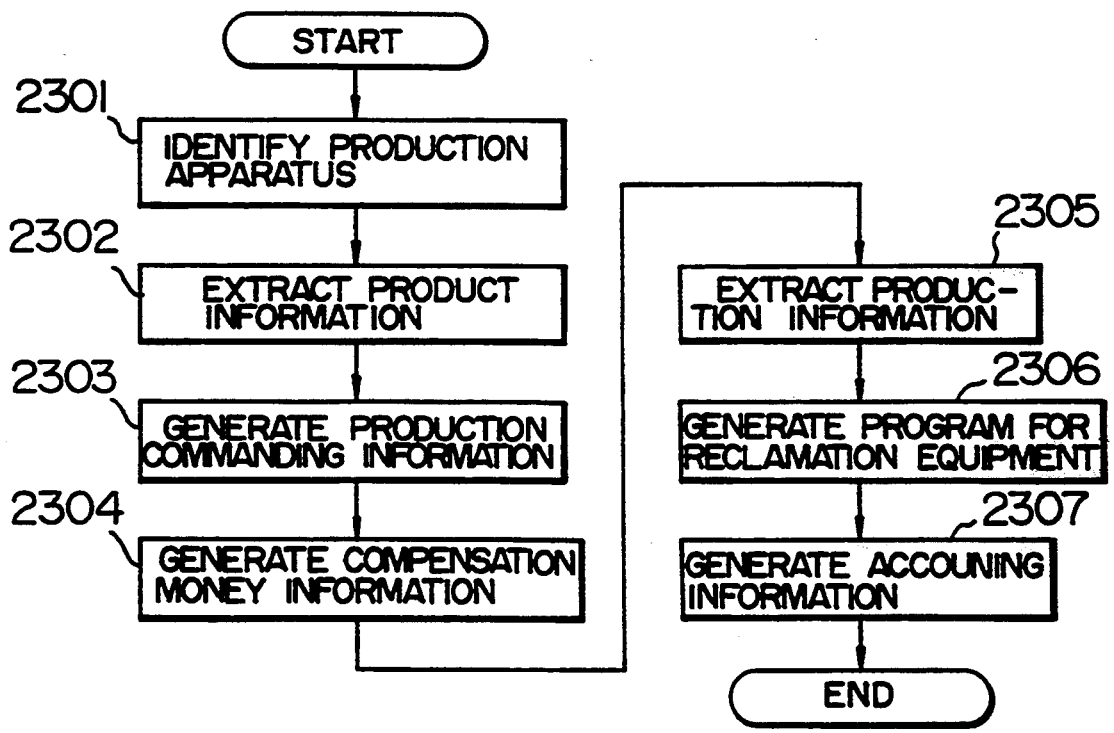
FIG. 23 is a flow chart showing a flow of processing executed by an information processing unit in the recovery factory of FIG. 21.

FIG. 19 is a schematic diagram showing a product circulation method; FIG. 20 is a block diagram showing the configuration of a recovery factory; FIG. 21 is a block diagram showing the configuration of another recovery factory; FIG. 22 is a flow chart showing a flow of processing executed by an information processing unit in the recovery factory of FIG. 20; and FIG. 23 is a flow chart showing a flow of processing executed by an information processing unit in the recovery factory of FIG. 21.

The product circulation system of FIG. 19 shows a recovery factory 2, 3 (3A) and a recovery apparatus 3a. Since other constituents designated the same reference numerals as those in FIG. 3 are equivalent thereto, explanation thereof will be omitted.

The essence of the product circulation lies in the automation of product specification determination operations for replacing a previous product by a corresponding equivalent to that currently circulating in the market and in the establishment of an accounting route for expense required for replacing the previous product. For this purpose, the product circulation system shown in FIG. 19 is provided with an information circulation route between the recovery factory 3 for recovering the previous product and determining the specification of a possible replacement product corresponding to the previous product and a production factory 1 for producing the replacement product. This information circulation route specifically comprises a computer network 7 and two paths for circulating plates.

The computer network 7 couples a manufacturing apparatus, described later, with the recovery apparatus 3a and is used, for example, to transmit product information on a currently circulated product from the production factory 1 to the recovery factory 3. More specifically, the recovery factory 3 accesses the production factory 1 through the computer network 7 to extract information on the specifications of products equivalently corresponding to a recovered product. The recovery factory 3 automatically selects and determines the specification of a replacing product corresponding to the recovered product based on information on a plurality of products thus obtained. The details of this process will be described later in detail. The manufacturing apparatus 1a in the production factory 1 has stored therein product information on a plurality of products which are currently manufactured and circulated.

Figure 2:
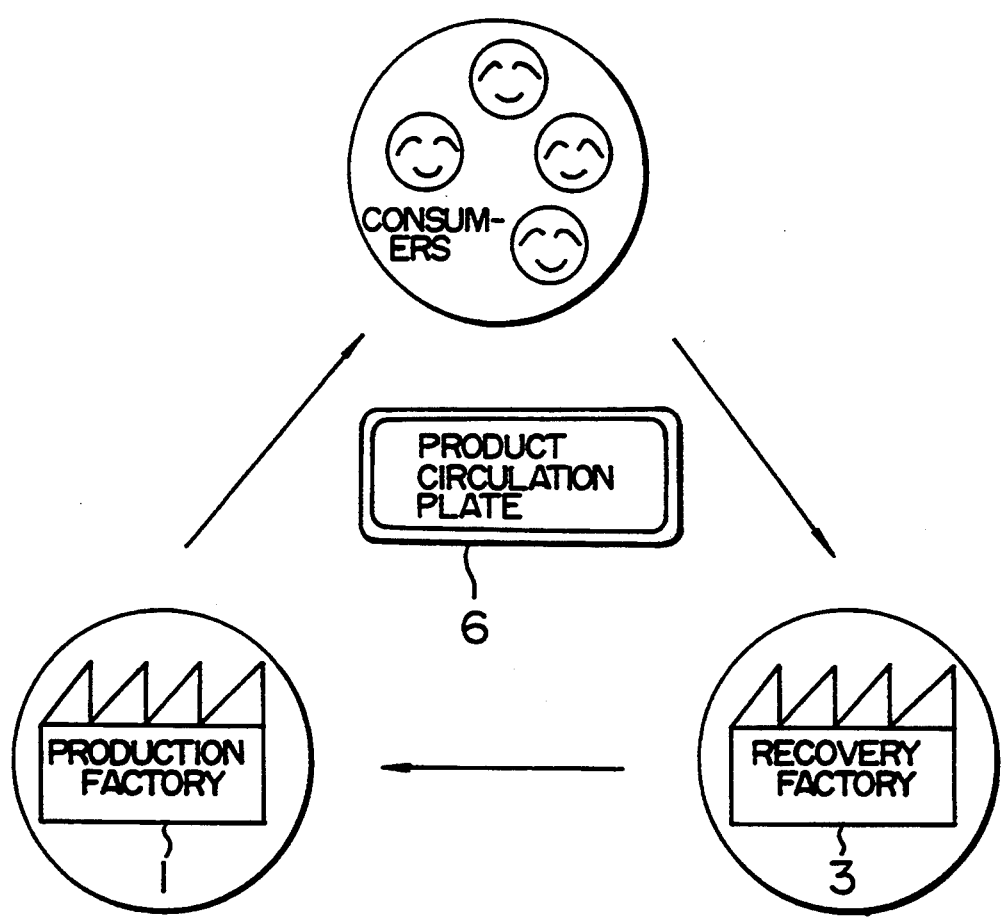
FIG. 2 is a diagram for explaining the principle of a product circulation system.

The foregoing plate circulation path includes a plate market 9 and a product market 8. The recovery factory 3 issues product circulation plates 6 (see FIG. 2) to the plate market 9 and recovers products with the product circulation plate 6 from the product market 8.

The production factory 1, on the other hand, acquires the product circulation plates 6 from the plate market 9 and ships products having the product circulation plates 6 mounted thereon to the product market 8. In this event, information for accessing product information is written on the product circulation plate 6 in the production factory 1. This product circulation plate 6 serves as the guaranty for ensuring that a previous product with this plate 6 is replaced. For example, consumers can trust the recovery factory 3 with recovery of the previous products having the product circulation plate 6 mounted thereon and a procedure for acquiring an equivalent new product corresponding to the previous product so as to order the production factory 1 to manufacture the corresponding product.

The configuration of the recovery apparatus 3a provided in the recovery factory 3 will be explained in detail in connection with an embodiment thereof with reference to FIG. 20. The recovery factory 3 comprises a plate recognition unit 31, an information processing unit 32 and a stamper 34, as shown in FIG. 20. The plate recognition unit 31 recognizes the production circulation plate 6 (an example of which will be described later) mounted on a recovered product 4 sent from the product market 8, and transmits the recognition result to the information processing unit 32. The information processing unit 32 determines the specification of a corresponding new product based on the plate recognition result, transmits the determined specification to the production factory 1, and generates compensation money information on the manufacturing of the new product in place of the recovered product 4. The compensation money information is written on the product circulation plate 6 by the stamper 34.

The compensation money is paid to the recovery factory by the production factory as compensation for recovering products (or charged to the production factory), the recovery factory 3 collects the money from the production factory as compensation for the plate.

The recovery apparatus 3a constructed as shown in FIG. 20, reads information from the product circulation plate 6 mounted on the recovered product 4 but does not perform any operation associated with the recovered product itself.

FIG. 21 shows the configuration of a recovery factory 3A according to another embodiment. The recovery factory shown in FIG. 21 performs replacement and disassembly of a previous product in combination.

The recovery apparatus 3a provided in the recovery factory 3 shown in FIG. 21 comprises a plate recognition unit 31; an information processing unit 32; a stamper 34; and reclamation equipment 33.

The plate recognition unit 31 recognizes the product circulation plate 6 mounted on each recovered product sent from the product market 8, and transmits the recognition result to the information processing unit 32. The information processing unit 32 accesses the production factory 1 based on the plate recognition result to transmit thereto the specification of a corresponding new product determined from currently circulated products as well as generates a control program for the reclamation equipment 33 and compensation money and accounting information. The reclamation equipment 33 disassembles recovered products in accordance with the control program given thereto from the information processing unit 32 and reclaims useful resources. Further, the stamper 34 writes the compensation money and accounting information on the product circulation plate 6.

FIG. 22 represents in a flow diagram form the operation of the information processing unit 32 in the recovery factory 3 shown in FIG. 20. The information processing unit 32 first identifies a manufacturing apparatus by which a recovered product was made, based on the plate recognition result output by the plate recognition unit 31 (step 2201). Next, the information processing unit 32 accesses the identified manufacturing apparatus in the production factory through the computer network 7 to extract information on currently circulated products equivalently corresponding to the recovered product 4 (step 2202). Based on the product information thus obtained, the information processing unit 32 generates information for commanding production of a product selected as a replacement (step 2203), and transmits the commanding information to a corresponding manufacturing apparatus through the computer network 7. Simultaneously, the information processing unit 32 adds costs required to produce the new product and generates compensation money information which is then written on the product circulation plate 6 (step 2204).

FIG. 23 represents in a flow diagram form the operation of the information processing unit 32 in the recovery factory 3A shown in FIG. 21. The information processing unit 32 first identifies a manufacturing apparatus by which a recovered product 4 was manufactured, based on the plate recognition result output by the plate recognition unit 31 (step 2301). The information processing unit 32 next accesses the identified manufacturing apparatus in the production factory through the computer network 7 to extract product information corresponding to the recovered product 4 (step 2302). Then, the information processing unit 32 generates information for commanding production of a product selected as a replacement based on the product information thus obtained (step 2303), and transmits the commanding information to the corresponding manufacturing apparatus through the computer network 7. Simultaneously, the information processing unit 32 adds costs required to produce the new product and generates compensation money information which is then written on the product circulation plate 6 (step 2304).

The information processing unit 32 further accesses the corresponding manufacturing apparatus to extract production information on the recovered product 4 which will be needed for reclamation processing (step 2305), and generates a control program associated with the production commanding information of the reclamation equipment 33 (step 2306). Simultaneously, the information processing unit 32 adds costs required for the reclamation processing and generates accounting information which is written on the product circulation plate 6 (step 2307).

The production factory 1 in the product circulation system of this embodiment is constructed similarly to the production factory 1 in the foregoing resource recycling system and method, and functions in a manner similar to the same.

Specifically, the manufacturing apparatus 1a in the production factory 1 of this embodiment is provided with a writing unit 12 and a mounting unit 13 in addition to an ordinary production apparatus 11 as correspondingly shown in the foregoing FIG. 9. The writing unit 12 receives a production circulation plate 6' having compensation money information written thereon from the recovery factory 3 through the plate market 9 and outputs a complete plate 6 in which product information has been written.

Figure 24:
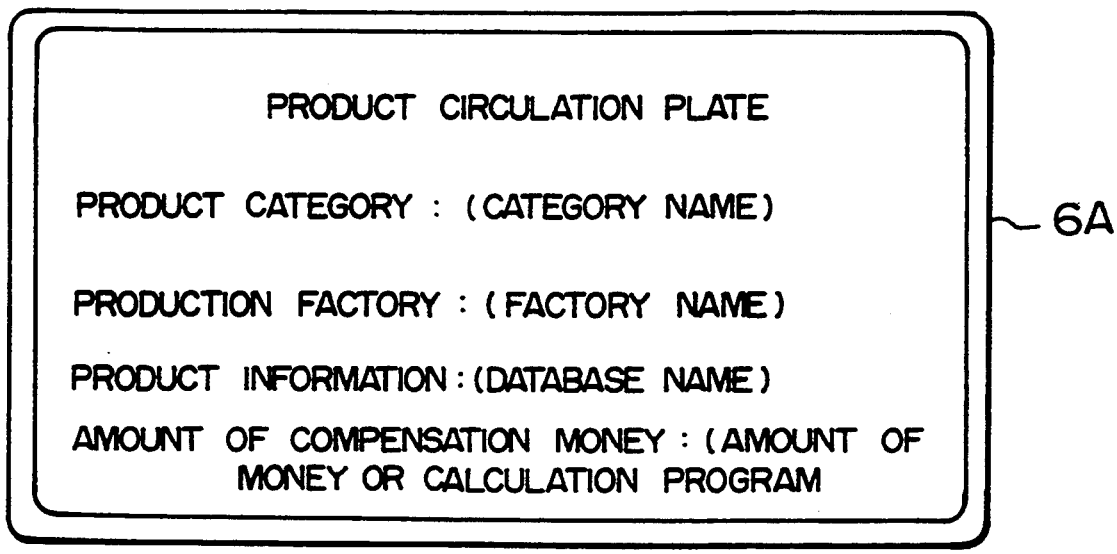
FIG. 24 shows a front view of a complete product circulation plate.
Figure 25:
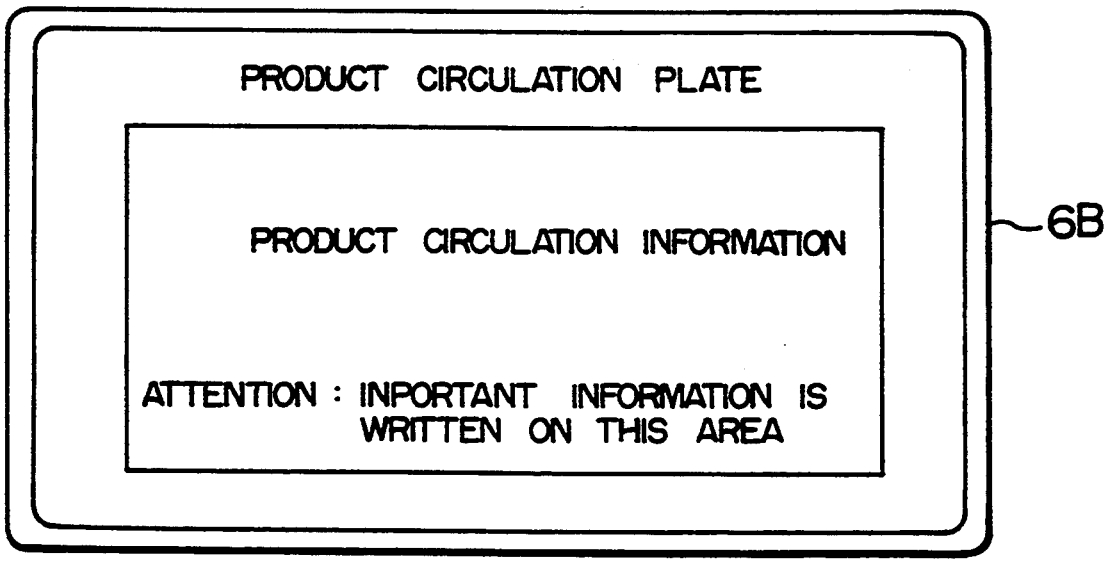
FIG. 25 shows a front view of another complete product circulation plate.
Figure 26:
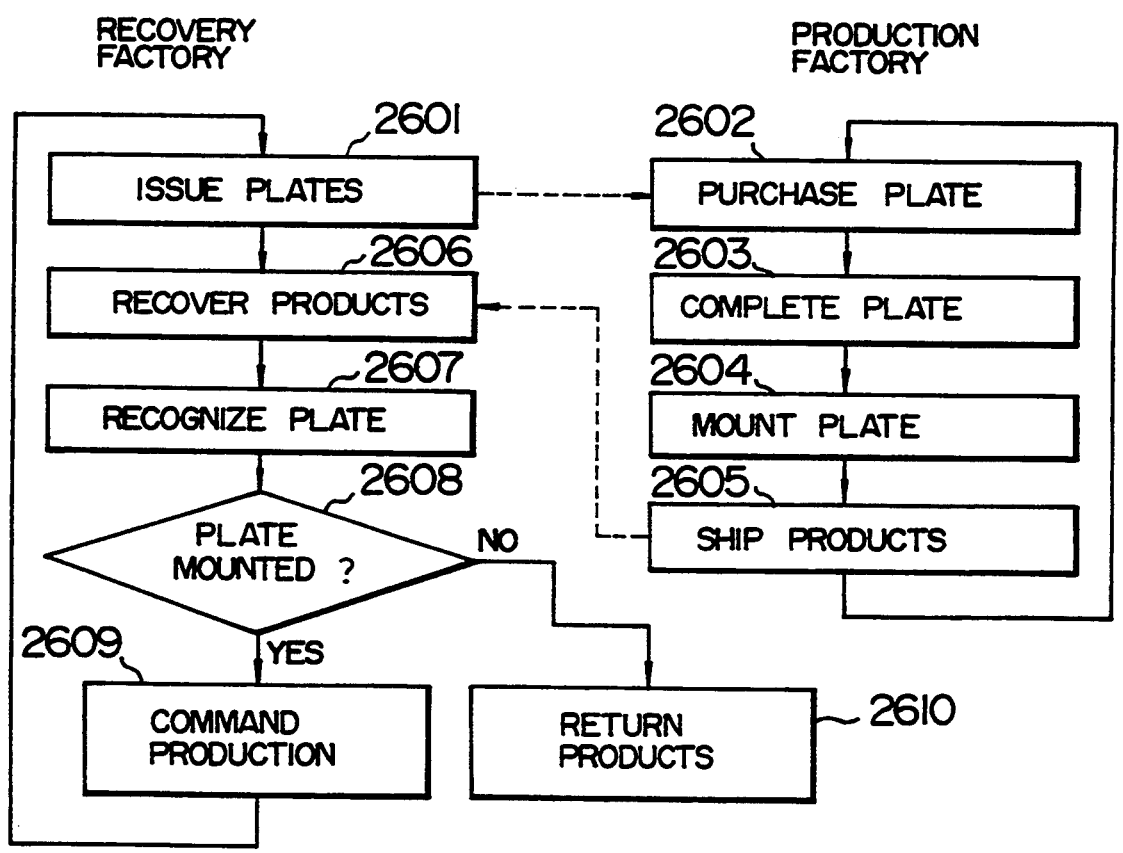
FIG. 26 is a flow chart showing a flow of a plate for guaranty.
Figure 27:
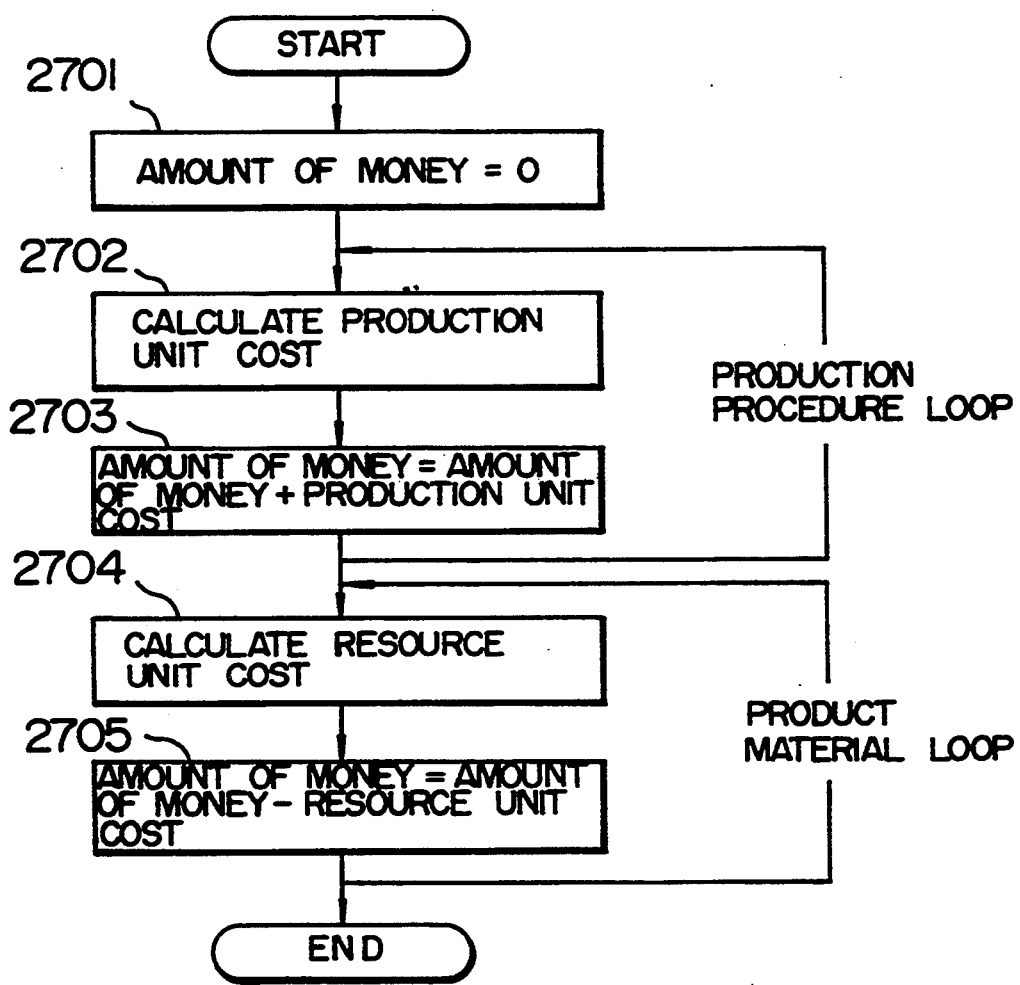
FIG. 27 is a flow chart showing a flow of compensation money calculations.

The processing on the plate will now be explained in detail with reference to FIGS. 24–27. FIG. 24 shows a front view of a complete product circulation plate; FIG. 25 shows a front view of another complete product circulation plate; FIG. 26 is a flow chart showing a flow of a plate for guaranty; and FIG. 27 is a flow chart showing a flow of compensation money calculations.

A product circulation plate 6A shown in FIG. 24 has recorded thereon product circulation information, i.e., a category name indicating a product category; a factory name indicating a production factory; a database name indicating a location in which production information is stored; and an amount of money indicating an amount of compensation money or a calculation program.

Within these recorded items, the production factory information and the product information are recorded by the writing unit 12 in the production factory 1. The product category information and the compensation money information in turn may be recorded either in the production factory 1 or in the recovery factory 3.

Another product circulation plate 6B shown in FIG. 25 has recorded thereon product circulation information in a machine readable form. Within these recorded items, the production factory information and product information (or corresponding data base name) are recorded by the writing unit 12 in the production factory 1. The product category information and compensation money information in turn may be recorded either in the production factory 1 or in the recovery factory 3.

The writing unit 12 in the production factory 1 of this embodiment performs operations in accordance with the flow shown in the foregoing FIG. 15. Specifically, since the product category information and the compensation money information have already been recorded on the acquired plate, the production factory information and the product information only are written thereon by the writing unit 12 in the processing flow of FIG. 15.

The mounting unit 13 in the production factory 1 of this embodiment also performs operations in accordance with the flow shown in the foregoing FIG. 16. Specifically, the mounting unit 13 has functions of receiving the product circulation plate 6, which is a complete plate, from the writing unit 12 and mounting it to a product 10. It should be noted that the configuration of the plate reading unit in the above-mentioned operations is similar to that shown in FIG. 12 provided in the foregoing embodiment.

FIG. 26 shows a flow of a plate for guaranty according to the product circulation method of this embodiment. The product circulation plate 6, which has an amount of compensation money recorded thereon, is issued from the recovery factory 3 shown in FIG. 19 (step 2601), and taken back to the recovery factory 3 when a product having the plate 6 is recovered. In the meantime, the production factory 1 purchases production circulation plates (step 2602), writes required information on each of the plates to complete the production circulation plates 6 (step 2603), mounts the complete product circulation plate 6 to each product 10 (step 2604), and ships the products 10 (step 2605).

The product circulation plates 6 mounted on the products 10 shipped from the production factory 1 are brought to consumers through the product market 8 and remain therewith. Unnecessary products are taken back to the recovery factory 3 as recovered products 4 together with the product circulation plates 6 (step 2606).

In the recovery factory 3, the product circulation plate 6 on the recovered product 4 is recognized (step 2607). For the recovered products 4, the plate of which is recognized herein, a command is generated to produce new products which replaces the recovered products (step 2609), thus producing and delivering the new products. In this event, the recovered plates themselves may also be reused as plates for other products, after erasing information recorded thereon corresponding to individual recovered products. On the other hand, the recovered products 4, the production circulation plate 6 of which was not recognized, are returned (step 2610) in this embodiment. It should be understood, however, that this is a mere example and another processing method may be taken for the recovered products with unrecognized plates.

FIG. 27 shows an example of a procedure for calculating compensation money according to the product circulation method of this embodiment. In the flow of compensation money calculations shown in FIG. 27, the compensation money is calculated by subtracting the value of reclaimed resources from a cost required for producing a new product instead of the recovered product. In other words, a list of materials used in the production and a production procedure are obtained from the production information extracted from the production factory. As the production procedure is traced for each part used in the product, the production costs for the parts are added (steps 2701-2703).

Further, as the list of materials used in the production is traced, unit costs for all resources used in the parts are added (steps 2704, 2705). In this event, the resource unit costs are added such that the amount of the compensation money is reduced.

In the production circulation method of this embodiment, the connection between the production factory 1 and the reclamation factory 3 may be optionally changed as long as they can access the computer network 7 and the plate market 9. As a result, the competition principle acts also on the production factory 1. More specifically, even with the same product, the amount of compensation money may vary due to a difference in the production costs for a replacement product calculated by respective production factories based on the compensation money calculations shown in FIG. 27. This competition will result in promoting utilization of the same product specification for a longer time.

While the above respective embodiments have described the basic configurations and functions of the production factory, reclamation factory, recovery factory and so on in order to clarify technical ideas underlying the resource recycling and product circulation methods, the present invention may be implemented in a more specific form. Stated another way, the present invention may be realized in a large scale conception such as a national project. Also, it goes without saying that the present invention is applicable to relatively small scale systems possibly planned by private companies and organizations or the like and to reproduction systems which aim at particular fields of products.

The previously developed automated manufacturing, automated design techniques, computer network and so on are widely applied to the units and apparatuses in the respective factories and the information circulation means. Further, it goes without saying that developments of technology will be further demanded corresponding to systems which will be highly advanced in the future.

According to the embodiments so far described in detail, useful resources can be automatically extracted in the resource reclamation processes, and the accounting is enabled for rationally burdening all related parties with expense required for the reclamation of the resources, thus promoting reuse of the useful resources.

Also, in the replacement processes, the specification of a new product corresponding to a previous one can be automatically created, and the calculation of compensation money can be made for rationally burdening all related parties with the production cost required for the replacing product, thus promoting utilization of the same production specification for a longer time.

It is therefore appreciated that the present invention can reduce the product reclamation cost and increase the number of people utilizing the recycling processes, which results in a lower cost of the whole resource recycling processes.

We claim:

1. A resource recycling system which searches for information on specification and production method of a recovered product, which is recovered after being produced, and utilizes the recovered product as resources to reproduce an original product, comprising:
   a plurality of production factories each for producing a predetermined product, each of said production factories having a manufacturing apparatus in which production information necessary for producing the product is stored;
   a reclamation factory for recovering said products, having a reclamation apparatus for reclaiming from said recovered products resources usable for reproducing the original product;
   communication means connected to said manufacturing apparatus and said reclamation apparatus for transmitting production information necessary for producing said product between these manufacturing apparatus and reclamation apparatus; and a recycle plate which is created by said reclamation apparatus and on which information for identifying a manufacturing apparatus is written, said recycle plate being mounted to a product when the product is produced by said manufacturing apparatus, and recovered from each of recovered products by said reclamation apparatus in order to transmit from said reclamation apparatus to said manufacturing apparatus accounting information on an amount of money required to reproduce said product from the reclaimed resources, wherein said reclamation apparatus identifies a manufacturing apparatus by which the recovered product has been produced from said recovered recycle plate, extracts production information on the product from the identified manufacturing apparatus through said communication means, and generates a disassembly procedure for the recovered product from the production information.

2. A resource recycling system according to claim 1, wherein:

said reclamation factory recognizes the recycle plate mounted on said recovered product, identifies a manufacturing apparatus associated therewith based on the recognition result, extracts the production information on said recovered product from the identified manufacturing apparatus, creates a control program for the reclamation apparatus based on the extracted production information, and generates accounting information based on the control program for the reclamation apparatus.

3. A resource recycling system according to claim 2, wherein:

said reclamation apparatus in the reclamation factory disassembles the recovered product in accordance with said control program to reclaim resources.

4. A resource recycling system according to claim 1, wherein:

said production factory introduces said recycle plate created in the reclamation factory, writes production information on said recycle plate, mounts said recycle plate to a product, and ships said product with said recycle plate.

5. A resource recycling system according to claim 1, wherein:

said recycle plate has at least a product category, a production factory name, a production information stored location, and an amount of accounting money recorded thereon in a machine readable form.

6. A resource recycling system according to claim 1, wherein:

said reclamation factory creates blank recycle plates; said production factory mounts the recycle plate to each product produced thereby; and said reclamation factory only recovers products having said recycle plates mounted thereon as recovered products.

7. A resource recycling method for searching for information on specification and production method of a recovered product, which is recovered after being produced, and for reproducing an original product with said recovered product utilized as resources, said method comprising the steps of:

storing production information on a product into a manufacturing apparatus when the product is manufactured thereby, mounting a recycle plate, on which information for identifying a manufacturing apparatus has been written, to the product, and shipping the product having the recycle plate mounted thereon;

recognizing said recycle plate on a recovered product for identifying a manufacturing apparatus by which the recovered product was produced;

extracting production information on said recovered product from the identified manufacturing apparatus;

generating a disassembly procedure for said recovered product from the extracted production information; and writing on said recycle plate accounting information including expense required to produce the original product with resources reclaimed by said disassembly, and delivering said recycle plate to said manufacturing apparatus.

8. A product circulation system which searches for information on specification and production method of a recovered product, which is recovered after being produced, and produces a product equivalent to an original product, comprising:

a plurality of production factories each for producing a predetermined product, each of said production factories having a manufacturing apparatus in which production information necessary for producing the product is stored;

a recovery factory having a recovery apparatus for recovering said products;

communication means connected to said manufacturing apparatus and said recovery apparatus for transmitting production information necessary for producing said product between these manufacturing apparatus and recovery apparatus; and a product circulation plate which is created by said recovery apparatus and on which information for identifying a manufacturing apparatus is written, said product circulation plate being mounted to a product when the product is produced by said manufacturing apparatus, wherein said recovery apparatus identifies a manufacturing apparatus by which the recovered product was produced from said recovered product circulation plate, extracts production information on the product from the identified manufacturing apparatus through said communication means, and writes production information on a corresponding product equivalent to said recovered product from the extracted production information into said manufacturing apparatus for delivery.

9. A product circulation system according to claim 8, wherein:

said production information on a corresponding product is searched through said communication means from production information on products which are currently produced by said plurality of production factories.

10. A product circulation system according to claim 9, wherein:

said recovery factory further comprises a reclamation apparatus, wherein said recovery apparatus creates a program for controlling disassembly of the recovered products from said production information, and said reclamation apparatus disassembles the recovered products in accordance with said disassembly control program to reclaim resources useful for producing a product by said manufacturing apparatus.

11. A product circulation system according to claim 10, wherein:

said recovery factory writes on said production circulation plate compensation money information on expense required to manufacture a corresponding product equivalent to said recovered product with said reclaimed resources and delivers said product circulation plate having said compensation money information.

12. A product circulation system according to claim 9, wherein:

said production factory introduces the product circulation plates issued by said recovery factory, writes information on a manufacturing apparatus by which a product was produced on each of said product circulation plates, mounts the same to each product, and delivers the products each having said product circulation plate.

13. A product circulation system according to claim 9, wherein:

said product circulation plate has at least a product category, a production factory name, a product information stored location, and an amount of compensation money recorded thereon in a machine readable form.

14. A product circulation system according to claim 9, wherein:

said recovery factory creates the product circulation plates, said production factory mounts said product circulation plate to each product, and said recovery factory only processes products having said product circulation plate mounted thereon.

15. A product circulation method for searching for information on specification and production method of a recovered product, which is recovered after being produced, and for producing a product equivalent to an original product, comprising the steps of:

storing production information on a product into a manufacturing apparatus when the product is produced thereby, mounting to each product a product circulation plate in which information for identifying a manufacturing apparatus has been written before shipment, and shipping the products having the product circulation plate mounted thereon;

recognizing said product circulation plate on a recovered product to identify a manufacturing apparatus by which said recovered product was produced;

extracting from said identified manufacturing apparatus production information on said product;

searching said extracted production information for a corresponding product equivalent to said product; and transmitting production information on said corresponding product to said manufacturing apparatus.

16. A product circulation method according to claim 15, further comprising the steps of:

disassembling said recovered product based on said production information to reclaim resources usable for producing a product by said manufacturing apparatus; and writing, on said product circulation plate, information on expense required to produce said corresponding product with said reclaimed resources, and delivering said product circulation plate.

* * * * *